(12) United States Patent
Shiao et al.

(10) Patent No.: US 8,517,578 B2
(45) Date of Patent: Aug. 27, 2013

(54) ROAD-ADAPTIVE VEHICLE HEADLIGHT SYSTEM

(75) Inventors: Yaojung Shiao, Taipei (TW);
Chun-Cheng Chen, Kaohsiung (TW)

(73) Assignee: National Taipei University of Technology (TW)

( * ) Notice: Subject to any disclaimer, the term of this patent is extended or adjusted under 35 U.S.C. 154(b) by 351 days.

(21) Appl. No.: 12/906,293

(22) Filed: Oct. 18, 2010

(65) Prior Publication Data
US 2011/0210667 A1  Sep. 1, 2011

(30) Foreign Application Priority Data

Feb. 26, 2010 (TW) ............................... 99105695 A

(51) Int. Cl.
*B60Q 1/04* (2006.01)
(52) U.S. Cl.
USPC ............................ 362/467; 362/507; 362/512
(58) Field of Classification Search
USPC ................. 362/459, 465, 468, 469, 487, 507, 362/512, 515, 523, 525–532, 545
See application file for complete search history.

(56) References Cited

U.S. PATENT DOCUMENTS

| | | | |
|---|---|---|---|
| 3,522,423 A * | 8/1970 | Henry-Biabaud | 362/43 |
| 6,343,869 B1 | 2/2002 | Kobayashi | |
| 6,601,982 B1 * | 8/2003 | Begemann et al. | 362/545 |
| 6,908,207 B2 * | 6/2005 | Jeannot | 362/37 |
| 6,953,274 B2 * | 10/2005 | Rice | 362/526 |
| 7,540,638 B2 | 6/2009 | Dassanayake et al. | |
| 2006/0023461 A1 * | 2/2006 | Knight | 362/466 |
| 2010/0168958 A1 | 7/2010 | Baino | |
| 2011/0210666 A1 | 9/2011 | Shiao et al. | |

* cited by examiner

*Primary Examiner* — Anabel Ton
(74) *Attorney, Agent, or Firm* — Schmeiser, Olsen & Watts, LLP

(57) ABSTRACT

A road-adaptive vehicle headlight system includes at least one headlight device, which includes a curved base plate divided into an inner-side module, an outer-side module, and a middle module located between the inner-side and outer-side modules, and the middle module is further divided from top to bottom into an upper-side module, a basic module, and a lower-side module; a plurality of LED light sources differently distributed in the above modules; a power source assembly being connected to and driving the base plate to turn in different directions; and a controller electrically connected to the LED light sources and the power source assembly. With these arrangements, the headlight device of a car can quickly produce different light beam patterns, increase the road visibility and the illumination areas of the headlight devices, and accordingly, ensure high safety in driving.

7 Claims, 5 Drawing Sheets

ROAD-ADAPTIVE VEHICLE HEADLIGHT SYSTEM

CROSS-REFERENCE TO RELATED APPLICATION

This non-provisional application claims priority under 35 U.S.C. §119 (a) on Patent Application No(s).099105695 filed in Taiwan, R.O.C. on 26 Feb. 2010, the entire contents of which are hereby incorporated by reference.

FIELD OF THE TECHNOLOGY

The present invention relates to a road-adaptive vehicle headlight system, and more particularly to a road-adaptive vehicle headlight system that enables headlight devices thereof to quickly produce different light beam patterns, so as to increase the road visibility as well as the illumination areas of the headlight devices to ensure high safety in driving.

BACKGROUND

Conventional car headlights can only provide two working modes, namely, a low-beam mode and a high-beam mode. However, in some driving conditions, the conventional car headlights fail to provide suitable and sufficient road illumination. For example, when the car leans forward or backward due to a shifted center of gravity or bumping along a rough road, or when the car passes through a curved road, light beams from the headlights might not be able to fully project on and illuminate the road to thereby cause danger in driving. Therefore, there are increasing demands for adaptive headlights for car, which are also referred to as advanced car headlights.

According to the currently available adaptive headlight technique, a motor is used to drive the headlight to adjust its horizontal or sideward position. Either a headlight base or a reflection mirror is driven to achieve the positional adjustment of the headlight. However, the currently available car headlight beam adjusting technique has the disadvantages of slow response speed, high manufacturing cost, low flexibility in changing the headlight illuminating angles, etc.

In recent years, an adaptive car headlight technique using multiple light-emitting diodes (LEDs) as the light sources thereof has been developed. The multiple LED light sources are grouped and individually controlled to emit or not emit light beams, so as to show different headlight beam patterns.

However, the currently available high brightness LED technique is not mature, and the LED technique adopted by the existing adaptive headlight for car can be generally classified into two types. One of the two types applies the present LED light technique in the mass production of headlights and uses two or three groups of LED light sources for low beams, high beams and turning, respectively. The other type uses ultrahigh-brightness LED light sources as a design basis, and multiple LED light sources are arrayed at specific positions and angles. Different LED light sources are individually turned on or off under control according to actual need in different road conditions, so as to show required headlight beam patterns.

While the above-described adaptive car headlight using LED light sources has quick response time, high flexibility in headlight beam patterns and low maintenance cost, it has the disadvantage of non-continuous headlight beam pattern shifting, jumped headlight beam patterns, and causing discomfort to a rider's eyes.

It is therefore desirable and tried by the inventor to develop an improved road-adaptive vehicle headlight system, so that headlight devices on a car can quickly and flexibly produce different light beam patterns to increase the road visibility as well as the illumination areas of the headlight devices to ensure high safety in driving.

SUMMARY

A primary object of the present invention is to provide a road-adaptive vehicle headlight system, in which a plurality of LED light sources is arrayed on a curved base plate at specific positions and angles, and the whole base plate is driven by a power source assembly to turn in different directions, so that headlight devices on the car can quickly and flexibly produce different headlight beam patterns to increase the road visibility as well as the illumination areas of the headlight devices to ensure high safety in driving.

To achieve the above and other objects, the road-adaptive vehicle headlight system provided by the present invention includes at least one headlight device, which includes a base plate, a plurality of LED light sources, a power source assembly, and a controller.

The base plate is a curved member, and includes an inner-side module, an outer-side module, and a middle module located between the inner-side and the outer-side module. Further, the middle module is divided from top to bottom into an upper-side module, a basic module, and a lower-side module. The LED light sources are distributed in the inner-side module, the outer-side module, the upper-side module, the basic module, and the lower-side module. The power source assembly is connected to the base plate for driving the base plate to turn upward or downward and leftward or rightward. The controller is electrically connected to the plurality of LED light sources and the power source assembly.

Therefore, by arraying a plurality of LED light sources on the curved base plate at specific positions and angles, and driving the whole base plate by the power source assembly to turn in different directions, the headlight devices on the car can quickly and flexibly produce different headlight beam patterns to increase the road visibility as well as the illumination areas of the headlight devices to ensure high safety in driving.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION

Figure 1:
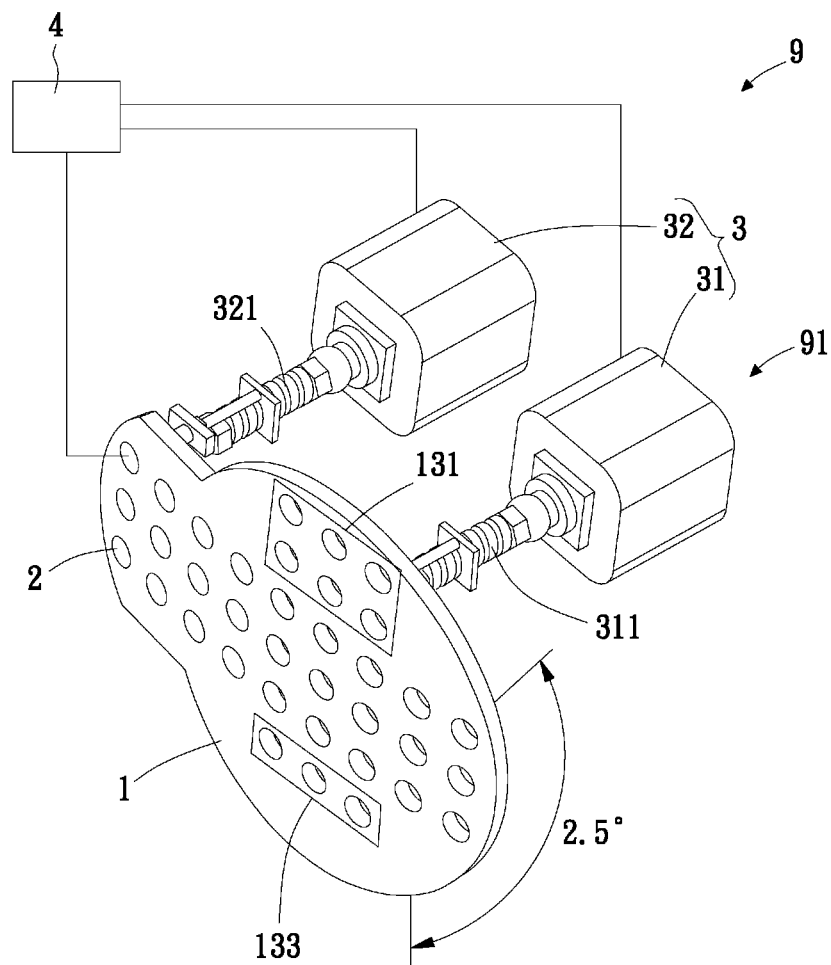
FIG. 1 is a perspective view of a road-adaptive vehicle headlight system according to a preferred embodiment of the present invention.
Figure 2:
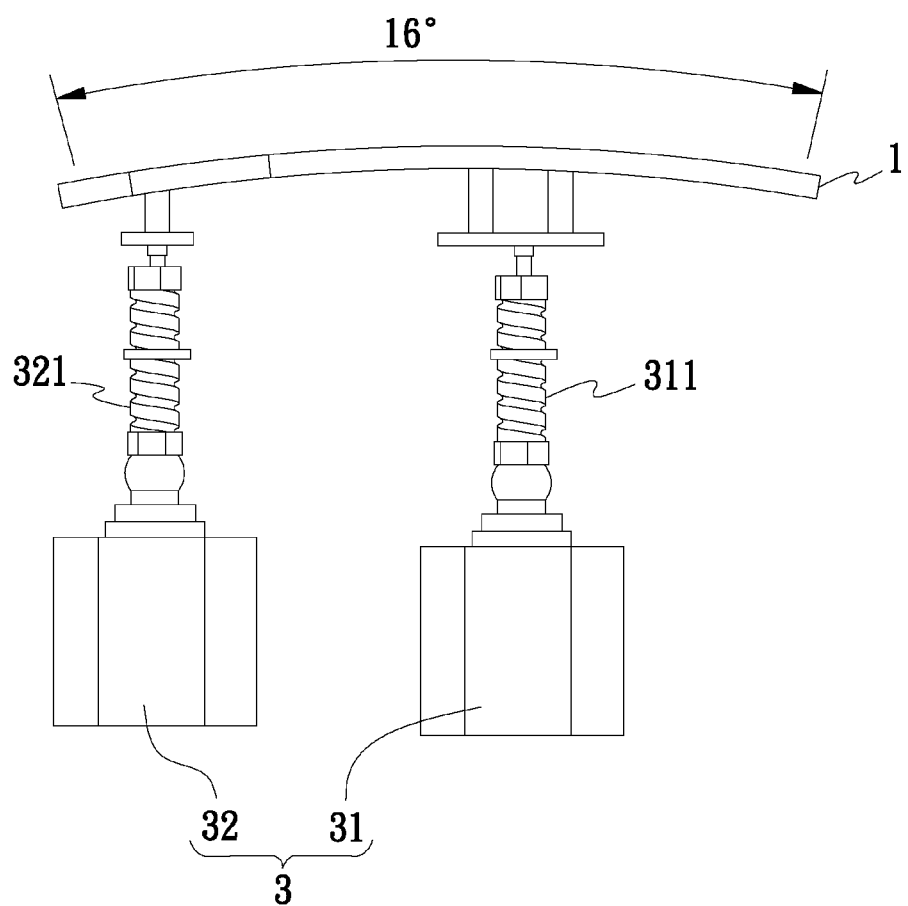
FIG. 2 is a top view of the road-adaptive vehicle headlight system of FIG. 1.

Please refer to FIGS. 1 and 2 that are perspective and top views, respectively, of a road-adaptive vehicle headlight system according to a preferred embodiment of the present invention. The present invention will also be briefly referred to as "the adaptive headlight system" herein and is generally denoted by reference numeral 9.

The road-adaptive vehicle headlight system 9 generally includes two laterally symmetric headlight devices 91, namely, a left and a right headlight device 91. In the following description of the preferred embodiment, only the right headlight device 91 is described.

Figure 3:
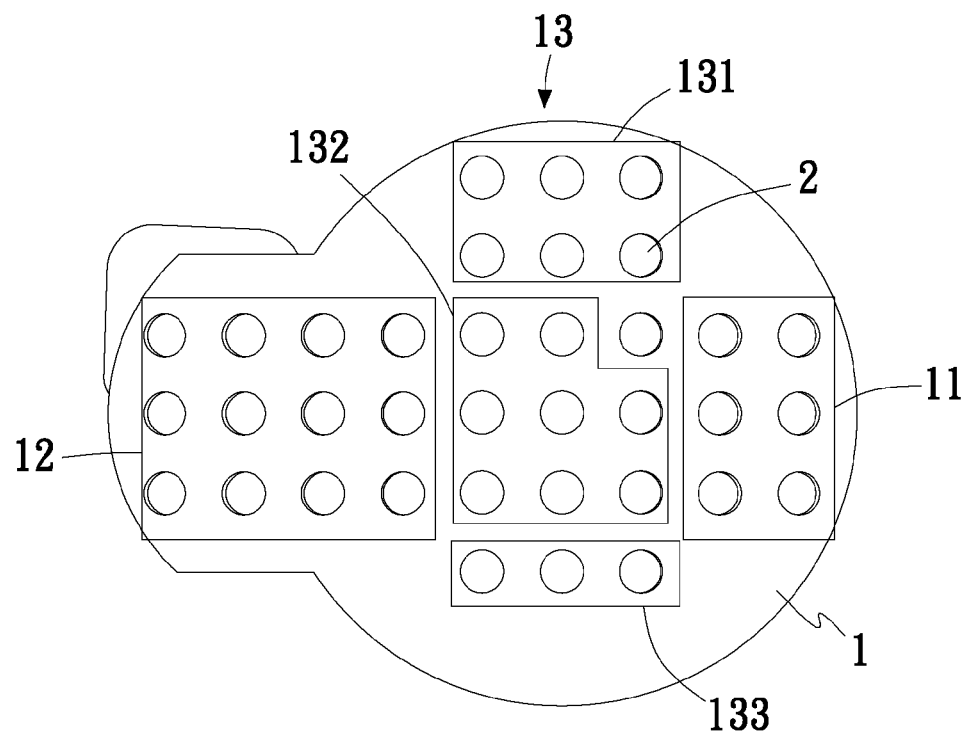
FIG. 3 is a front view of a base plate for the road-adaptive vehicle headlight system according to the preferred embodiment of the present invention.

FIG. 3 is a front view of a base plate for the adaptive headlight system 9. Please refer to FIGS. 1, 2 and 3 at the same time.

As shown, the headlight device 91 of the adaptive headlight system 9 includes a base plate 1, a plurality of LED light sources 2, a power source assembly 3, and a controller 4.

The illustrated base plate 1 is a curved member, and includes an inner-side module 11, an outer-side module 12, and a middle module 13 located between the inner-side module 11 and the outer-side module 12. The middle module 13 is further divided from top to bottom into an upper-side module 131, a basic module 132, and a lower-side module 133.

In the illustrated preferred embodiment, an angle contained between a top of the upper-side module 131 and a bottom of the lower-side module 133 on the base plate 1 is about 2.5°, as can be seen in FIG. 1; and an angle contained between an outer end of the outer-side module 12 and an inner end of the inner-side module 11 is about 16°, as can be seen in FIG. 2. It is understood the above-mentioned angles are only a preferred embodiment and the base plate 1 can of course be designed to have other curve angles.

The inner-side module 11, the outer-side module 12, the upper-side module 131, the basic module 132, and the lower-side module 133 are respectively provided with a set of LED light sources 2. In the illustrated preferred embodiment, the LED light sources 2 are high-brightness LEDs 2.

And, as in the illustrated preferred embodiment, the power source assembly 3 is connected to the base plate 1 for driving the base plate 1 to turn upward or downward and leftward or rightward; and the controller 4 is electrically connected to the plurality of LED light sources 2 and the power source assembly 3.

In the illustrated preferred embodiment, the power source assembly 3 includes a first power source 31 and a second power source 32, which are respectively a motor. The first power source 31 is connected to the base plate 1 via a screw rod 311 for driving the base plate 1 to turn upward or downward; and the second power source 32 is connected to the base plate 1 via another screw rod 321 for driving the base plate 1 to turn leftward or rightward.

Figure 4:
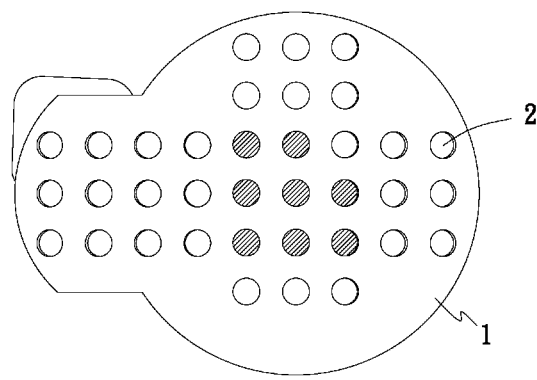
FIG. 4 shows the road-adaptive vehicle headlight system according to the preferred embodiment of the present invention in a first use state.
Figure 5:
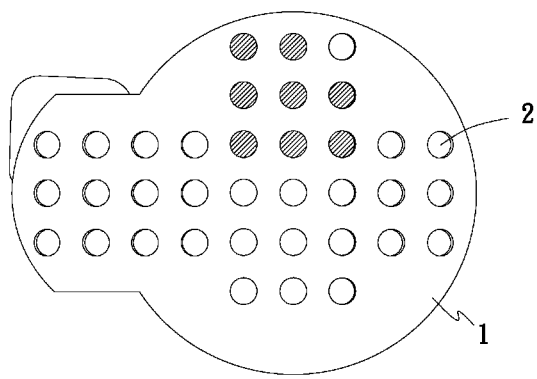
FIG. 5 shows the road-adaptive vehicle headlight system according to the preferred embodiment of the present invention in a second use state.
Figure 6:
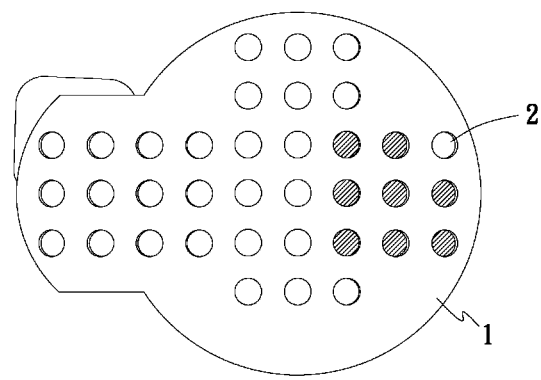
FIG. 6 shows the road-adaptive vehicle headlight system according to the preferred embodiment of the present invention in a third use state.
Figure 7:
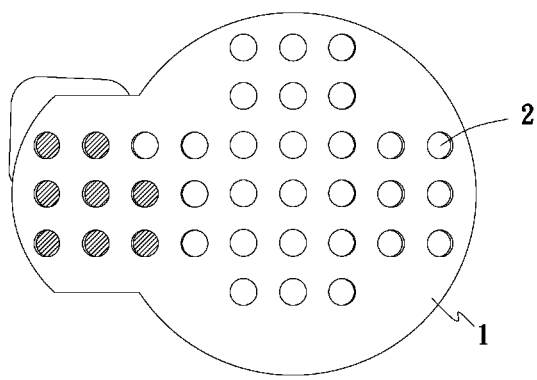
FIG. 7 shows the road-adaptive vehicle headlight system according to the preferred embodiment of the present invention in a fourth use state.

Please refer to FIG. 1 along with FIGS. 4, 5, 6, and 7. FIG. 4 shows the adaptive headlight system 9 in a first use state; FIG. 5 shows the adaptive headlight system 9 in a second use state; FIG. 6 shows the adaptive headlight system 9 in a third use state; and FIG. 7 shows the adaptive headlight system 9 in a fourth use state.

To achieve different use states of the headlight device 91 of the adaptive headlight system 9 as shown in FIGS. 4 to 7, light beams from the headlight device 91 are adjusted by the controller 4, which controls the LED light sources 2 to turn on/off and controls the power source assembly 3 to turn the curved base plate 1 according to different car body positions, different car speeds, and different road conditions. For example, FIG. 4 shows the on/off of the LED light sources 2 when the headlight device 91 is in a basic lighting mode; FIG. 5 shows the on/off of the LED light sources 2 when the headlight device 91 is in a small-range horizontally up-shifting lighting mode; FIG. 6 shows the on/off of the LED light sources 2 when the headlight device 91 is in a small-range left-turn lighting mode; and FIG. 7 shows the on/off of the LED light sources 2 when the headlight device 91 is in a small-range right-turn lighting mode.

In other words, for example, when the front end of the car is lowered or raised, the controller 4 controls the LED light sources 2 at different horizontal positions to turn on or off, or controls the power source assembly 3 to adjust the curved base plate 1 to turn upward or downward to a desired level; or when the car passes a curved road, the controller 4 controls the LED light sources 2 at different leftward or rightward positions to turn on or off, or controls the power source assembly 3 to adjust the curved base plate 1 to turn leftward or rightward to a desired angular position, so that light beams from the headlight device 91 illuminate the road surface to be passed; or when the car passes a road crossing or changes the car speed and therefore requires relatively wide illumination area and proper illumination distance, the controller 4 not only controls the main LED light sources 2 to turn on, but also turns on the LED light sources 2 that are distributed in the inner-side module 11, the outer-side module 12, the upper-side module 131, and the lower-side module 133, so as to provide different light beam patterns to meet code requirements as well as the driver's need.

When the adaptive headlight system 9 of the present invention operates, steering or changing of the light beams from the headlight device 91 can be achieved by the controller 4, which controls the power source assembly 3 (motors) to turning the curved base plate 1 and/or controls different LED light sources 2 to turn on or off. That is, the steering or changing of the light beams from the headlight device 91 can be determined according to the driving environment and the speed and angle at which the light beams are to be shifted. For instance, when the light beams from the headlight device 91 are to be shifted by a relatively small angle, the controller 4 can control the on/off of the LED light sources 2 to achieve changes in the light beams from the headlight device 91; or when the light beams from the headlight device 91 are to be shifted by a relatively large angle but at a relatively slow speed, the controller 4 can control the power source assembly 3 to turn the curved base plate 1 to achieve changes in the light beams from the headlight device 91; or when the light beams from the headlight device 91 are to be shifted by a relatively large angle and at a relatively quick speed, the controller 4 can control the LED light sources 2 to turn on or off as well as controls the power source assembly 3 to coordinately turn the curved base plate 1 at the same time, in order to achieve changes in the light beams from the headlight device 91. Further, when the car runs in different driving environments, such as driving on city roads, on freeways, on curved roads, through road crossings, or on flooded roads, the LED light sources 2 within different modules on the base plate 1 would be lightened to produce different light beam patterns, so as to provide the driver with suitable road illumination to increase the road visibility and safety in driving. That is, when different road conditions are encountered during driving, the controller 4 can control the LED light sources 2 within different modules to turn on while coordinately controls the power source assembly 3 (motors) to turn the curved base plate 1 by different angles, so as to present different illumination patterns to meet the illumination effects required in various road conditions.

With the above arrangements, it is able to eliminate the drawbacks of fixed light beams in the conventional headlight device and to provide highly flexible changes in the patterns of light beams from the headlight device. With the present invention, it is also possible to overcome the drawback of slow headlight beam changing speed as found in the general motor-driven adaptive headlight systems. Furthermore, it is also possible to improve the problem of non-continuous change of light beam patterns, so as to achieve almost continuous headlight beam pattern shifting. In this manner, the road-adaptive vehicle headlight system according to the present invention can largely reduce the number of blind spots in headlight illumination, increase the flexibility in the headlight beam patterns, expand the illumination range and area of the headlight, and enable increased safety in car driving.

In other words, according to the configuration of the present invention, a plurality of LED light sources 2 are arrayed on a curved base plate 1 at specific positions and angles and the whole base plate 1 can be driven by a power source assembly 3 to turn in different directions, enabling the headlight devices 91 of a car to quickly produce different light beam patterns, which increases the road visibility as well as the illumination areas of the headlight devices to ensure high safety in car driving.

Accordingly, the road-adaptive vehicle headlight system according to the present invention is novel, improved, and industrially practical for use. The present invention is novel and improved because it has a plurality of LED light sources arrayed on a curved base plate at specific positions and angles and allows the whole base plate to be driven by a power source assembly to turn in different directions, so that the headlight devices of a car can quickly produce different light beam patterns, which increases the road visibility as well as the illumination areas of the headlight devices to ensure high safety in car driving. It is trusted products derived from the present invention would fully satisfy the current market demands for the road-adaptive vehicle headlight system.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A road-adaptive vehicle headlight system, comprising at least one headlight device, and the headlight device comprising:
   a base plate being a curved member and including an inner-side module, an outer-side module, and a middle module located between the inner-side module and the outer-side module, wherein the middle module is further divided from top to bottom into an upper-side module, a basic module, and a lower-side module;
   a plurality of LED light sources being separately distributed in the inner-side module, the outer-side module, the upper-side module, the basic module, and the lower-side module;
   a power source assembly being connected to the base plate for driving the base plate to turn upward or downward and leftward or rightward; and
   a controller being electrically connected to the plurality of LED light sources and the power source assembly;
   wherein the power source assembly includes a first power source and a second power source, the first power source driving the base plate to turn upward or downward, and the second power source driving the base plate to turn leftward or rightward;
   wherein the first power source is connected to the base plate via a screw rod for driving the base plate to turn upward or downward.

2. The road-adaptive vehicle headlight system as claimed in claim 1, wherein the second power source is connected to the base plate via a screw rod for driving the base plate to turn leftward or rightward.

3. The road-adaptive vehicle headlight system as claimed in claim 1, wherein the first power source and the second power source are respectively a motor.

4. The road-adaptive vehicle headlight system as claimed in claim 1, wherein an angle contained between a top of the upper-side module and a bottom of the lower-side module is about 2.5°.

5. The road-adaptive vehicle headlight system as claimed in claim 1, wherein an angle contained between an outer end of the outer-side module and an inner end of the inner-side module is about 16°.

6. A road-adaptive vehicle headlight system, comprising at least one headlight device, and the headlight device comprising:
   a base plate being a curved member and including an inner-side module, an outer-side module, and a middle module located between the inner-side module and the outer-side module, wherein the middle module is further divided from top to bottom into an upper-side module, a basic module, and a lower-side module;
   a plurality of LED light sources being separately distributed in the inner-side module, the outer-side module, the upper-side module, the basic module, and the lower-side module;
   a power source assembly being connected to the base plate for driving the base plate to turn upward or downward and leftward or rightward; and
   a controller being electrically connected to the plurality of LED light sources and the power source assembly;
   wherein the power source assembly includes a first power source and a second power source, the first power source driving the base plate to turn upward or downward, and the second power source driving the base plate to turn leftward or rightward;
   wherein the second power source is connected to the base plate via a screw rod for driving the base plate to turn leftward or rightward.

7. The road-adaptive vehicle headlight system as claimed in claim 6, wherein the first power source is connected to the base plate via a screw rod for driving the base plate to turn upward or downward.

* * * * *